Sept. 9, 1958
C. C. DUBBS
2,850,786
METHOD OF MOLDING ARTICLES FROM LIQUID SUSPENSIONS
Filed Aug. 31, 1953
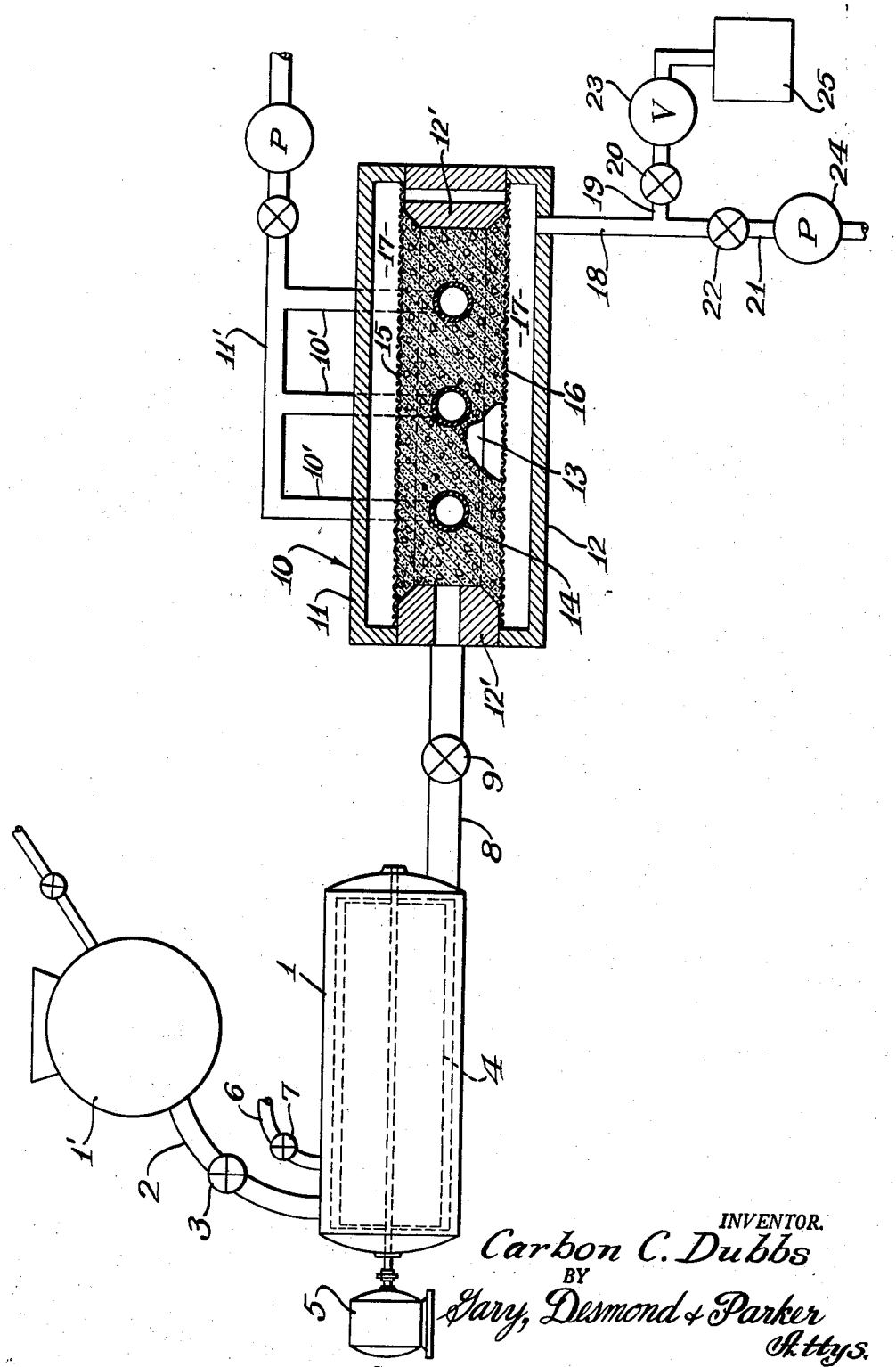
INVENTOR.
Carbon C. Dubbs
BY
Gary, Desmond & Parker
Attys.

United States Patent Office 2,850,786
Patented Sept. 9, 1958

2,850,786

METHOD OF MOLDING ARTICLES FROM LIQUID SUSPENSIONS

Carbon C. Dubbs, Orange, Calif.

Application August 31, 1953, Serial No. 377,494

6 Claims. (Cl. 25—155)

This invention relates to improvements in a process of molding products from a mix of solid particles in a liquid suspension and refers particularly to a process of molding wherein the mix to be molded carries a gas which, during the molding operation, is released, the released gas escaping from the molded mix and functioning to carry by entrainment from the molded mix portions of the liquid carrier.

While the process of the present invention is particularly directed to the molding of concrete products from a relatively fluid mix comprising cement, aggregate and water, it can also with equal advantage be used to mold products from other types of mixes containing a liquid carrier, such as, from an aqueous mix of fibres and water or from substantially any other type of mix which owes its plasticity or flowability to a liquid. For purposes of illustrating the invention, however, the molding of concrete products will be described.

In the molding of concrete it is desirable to use water in excess of the amount required for the hydration of the cement. The excess water imparts plasticity to the concrete and makes it readily flowable. This makes for easy handling and the rapid and complete filling of molds. However, the use of excessive water in the molding of concrete products is generally frowned upon for the following reasons: (1) An excessive amount of water makes the concrete so plastic that it cannot be demolded until initial set has taken place. This time factor is undesirable, especially in production molding where output and cost are closely related. (2) Concrete which sets in the presence of too great an amount of water is structurally weak, tends to chalk or dust, tends to shrink excessively and displays many other undesirable physical characteristics.

For a better understanding of my invention the broad principles of de-watering concrete will be briefly discussed. Freshly mixed very wet or fluid concrete can be visualized as containing a large percentage of water in which is suspended cement and aggregate. In molding, a predetermined percentage of water can be removed from the concrete mix by physically squeezing it by methods taught by the prior art. This may be done by applying superatmospheric pressure to the wet concrete during the molding step. However, after a predetermined pressure has been exerted on a concrete mix the solid particles of the mix are brought into contact with one another and no reasonable additional pressures will be effective in reducing the size or volume of the void spaces always existing between the contiguous solid particles, and the water entrapped in these void spaces resists removal by further or prolonged pressure and is invariably sufficient to give the concrete product a certain amount of slump if the product is to be immediately demolded.

In my copending application for patent Serial No. 121,802, filed October 17, 1949, now Patent 2,650,412, granted September 1, 1953, a process is described wherein a relatively fluid concrete mix is subjected to densifying pressure and vacuum. The densifying pressure moves the solid components of the mix into substantial contiguity and expels a predetermined portion of the liquid from the mix and the application of the vacuum during or following the densifying step releases pressure upon the liquid remaining in the void spaces between the contiguous solid components whereby dissolved, absorbed and occluded air is released from the mix, the released air escaping from the mix and carrying with it liquid in entrainment. Thus sufficient liquid can be removed from the mix to permit immediate demolding of the mix which can be removed and handled as a substantially non-slumping product.

My present invention contemplates a process wherein relatively large quantities of the liquid carrier of a molded mix may be removed by entrainment, that is, in entrainment in a gas carried in the mix which may be caused to move out of the mix, the gas being of such nature or being in such condition in the mix as to remove relatively large quantities of liquid carrier from the mix void spaces.

Briefly described I charge the water employed in mixing the concrete or the relatively fluid concrete mix itself with a gas which is highly absorbable or soluble in water. While any gas can be used that is not injurious to the product being made I prefer carbon dioxide because it is highly absorbable or soluble in water and because it has beneficial effects on concrete. I then apply a densifying compressive pressure to the gas-charged concrete mix or the concrete mix containing the gas-charged water while the mix is carried in a closed mold. This pressure will densify the concrete and squeeze out a large amount of water. I then subject the mix to a pressure lower than that at which the mix or mix-water was charged. Under this lower pressure a large portion of the gas carried by the water still retained in the interstices of the concrete will be released and, in effect, the water will boil, that is, a condition similar to effervescence takes place. The gas in escaping from the interstices tends to entrain the water in these interstices and carries it out of the concrete.

By my invention, products may be molded from highly fluid concrete mixtures, whereby the molded product will be molded to accurate exterior dimensions; the product will have uniform and high density; will have excellent physical properties and will in the process of molding obtain sufficient physical strength (as opposed to initial or chemical set) as to allow much more rapid demolding than would be possible with the use of conventional molding methods. For instance, I have found that it is entirely feasible to demold within a period of two minutes or less from the time of introduction of material into the mold and frequently it is possible to demold on a production basis within thirty seconds from the time the material is introduced into the mold. The demolded article in this case will be of substantially no-slump consistency, and will maintain its accuracy as to dimensions even though there has been no appreciable chemical set.

For a better understanding of my invention reference is made to the accompanying drawing which shows diagrammatically one form of apparatus suitable for carrying out my invention.

In carrying out my invention in its broadest aspects, a mix may be formed comprising solid material such as cement and aggregate, or fibrous material or the like, and a liquid carrier, the consistency of the mix being such that it can readily be flowed into all portions of a mold, that is, the mix is relatively fluid. A gas, preferably one which is highly soluble in the liquid carrier, is charged to the mix or to the liquid carrier before it is added to the other ingredients to form the mix. The mold employed is preferably one in which the mix introduced therein can be subject to pressure to squeeze out portions of the liquid carried by densifying the mix, that is, by moving the solid components of the mix into contiguous relationship. At this stage liquid carrier still remains in the mix in the interstices between the contiguous solid material. The mold is also such that the mix may be subjected to vacuum whereby the gas, carried in the mix, principally in the liquid carrier content thereof, including the liquid carrier in the interstices of the mix, will be caused to flow from the mix carrying therewith liquid carrier in entrainment. Thus, additional liquid carrier is removed from the mix to such an extent that the mix, as a physically compacted product may be substantially immediately removed from the mold as a self-supporting, substantially non-slumping product.

Referring particularly to the drawing, 1 indicates a tank having an inlet 2 controlled by valve 3 through which the ingredients of a mix, which owes its plasticity or flowability to a water carrier, may be introduced. The mix may be mixed in a suitable mixer 1' prior to introduction into the tank, and to prevent settling of the solid particles of the mix in the tank, an agitator 4 may be positioned in the tank, said agitator being driven by motor 5. A gas inlet pipe 6 controlled by valve 7 connects into the tank and is adapted to convey a suitable gas thereinto.

The gas introduced into the tank 1 through inlet pipe 6 is preferably carbon dioxide and may be introduced into said tank under superatmospheric pressure, or an atmosphere of carbon dioxide may be maintained in said tank at atmospheric pressure while the agitator 4 is operated to incorporate the gas in the mix. The tank 1 may be connected to a mix outlet pipe 8 controlled by valve 9 which latter is closed when the mix is introduced into the tank through the inlet pipe 2. After the mix is passed into the tank, the valve 3 is closed and agitator 4 is operated. At the same time valve 7 may be opened and carbon dioxide under substantially atmospheric or under superatmospheric pressure is passed into the tank. The agitation of the mix in the tank in the presence of the carbon dioxide causes the mix to be impregnated with quantities of said gas. The impregnation occurs by the gas going into solution in the water carrier and by absorption and adsorption of the gas by the solid particles of the mix. Thus, the mix in the tank can be impregnated with desired quantities of gas depending upon the pressure at which impregnation takes place, that is, if relatively high pressure is established in the tank, relatively large quantities of gas will be carried by the mix and with relatively lower pressures or at atmospheric pressure the mix will be impregnated with smaller quantities of gas.

Since impregnation of the mix with the carbon dioxide depends to a large extent upon the gas going into solution in the water carrier, a larger quantity of gas may be carried by the mix not only at higher pressures but also at lower temperatures. Hence, if desired, means (not shown) may be employed to cool the mix in the tank 1, or the water used in forming the mix may be precooled. Of course, if only very small quantities of the gas are to be incorporated in the mix, the mix may be heated or the water content thereof may be preheated. If desired, instead of impregnating the mix with the gas in the tank 1, the water employed in forming the mix in the mixer 1' may be impregnated with the gas during or before the mixing stage. Of course, if it is desired to supercharge the mix with the gas and to prevent premature release of the gas from the mix in the mixer 1' or in the tank 1, said mixer or tank may be maintained under superatmospheric pressure by an air or carbon dioxide atmosphere before the gas-impregnated mix is passed from the tank 1 to the mold, that is, the system comprising mixer 1' and/or tank may be maintained under superatmospheric pressure.

The mix outlet pipe 8 may connect into a closed mold 10 which may have a movable top 11, movable bottom 12 and movable end walls 12' and side walls 13. Expansible tubes 14, preferably of the resilient type, may be removably positioned in the mold 10 into which fluid under pressure may be introduced, through pipes 10' connected to fluid pressure header 11', to compress or densify the mix after its introduction into the mold. Foraminated upper and lower defining walls 15 and 16, respectively, may be disposed adjacent the top 11 and bottom 12 providing water-segregating spaces 17. A pipe 18 may connect into the spaces 17 through which water removed from the mix may be withdrawn, said pipe being connected to a vacuum pipe 19 controlled by valve 20. Pipe 18 may also be connected to a pressure pipe 21 controlled by valve 22. The vacuum pipe 19 may be connected to a suitable source of vacuum 23 and the pressure pipe 21 may be connected to a suitable source of fluid pressure 24.

The mold 10 and the other apparatus hereinbefore described, of course, is susceptible of many modifications and the hereinbefore described apparatus merely illustrates diagrammatically one form of apparatus which is suitable for carrying out my process. In my copending application Serial No. 157,343, filed April 21, 1950, now Patent 2,731,699, granted January 24, 1956, a suitable form of apparatus for carrying out the present invention is shown and described in detail.

After the mix in the tank 1 has been impregnated with the gas, the valve 9 may be opened and said mix may be forced, under carbon dioxide or air pressure or under gravity pressure from tank 1 to the interior of the mold. If gravity pressure is employed, the tank 1, of course, will be disposed above the level of the mold. When the mold has been completely filled, the valve 9 may be closed and fluid under pressure may be introduced into the expansible tubes 14. The tubes 14 will expand and thus will densify the mix in the mold, moving the solid portions of the mix into contiguous relationship with one another and expelling water from the mix through the foraminated walls 15 and 16 into the spaces 17. As has been hereinbefore described the pressure exerted by the tubes 14 will not remove the water from the interstices between the contiguous solid components thereof and this water would normally effectively prevent the molded product from being then demolded since it would tend to crumble or slump.

In order to remove this retained water, valve 20 in pipe 19 may be opened, either during the period of densification of the mix by tubes 14 or thereafter, and a vacuum established in the spaces 17. The vacuum will remove the water from spaces 17 previously squeezed from the mix by the tubes 14 and, in addition, the gas charged to said mix, principally the gas carried by the water content thereof will escape or flow out of the mix, due to the reduced pressure upon the mix. The gas thus moving out of the mix, carries with it, by entrainment, water entrapped in the interstices in the mix and, hence, sufficient additional water may be removed from the mix to permit substantially immediate demolding of the product. Of course, means (not shown) will be provided for deflating and removing tubes 14 before the product is demolded. I have found that in carrying out my invention that a physically strong, substantially non-slumping product may be demolded within two minutes and in many instances within thirty seconds from the time the mold is completely filled. That is, the product may be demolded before any appreciable chemical set of the cement takes place.

If desired, particularly where the mix or the water contained in the mix is supercharged with gas, that is, where the mix or the water contained in the mix is impregnated with gas under chilled conditions or under superatmospheric pressure, the valve 22 may be opened to pressurize the empty mold before valve 9 is opened to admit the mix. That is, a condition of superatmospheric pressure may be established in the mold before the mix completely fills the same so that there will be no premature escape or release of gas from the mix before the mix completely fills the mold. If movement of the mix to the mold is dependent upon the fluid pressure established in tank 1, the pressure established in mold 10 from the source 24 will be sufficiently below the tank pressure so that the mix will move into and completely fill the mold.

If, however, the mix is not supercharged with gas, that is, where the gas carried by the mix or the water contained therein has been incorporated therein at normal atmospheric pressure and normal temperature no superatmospheric pressure need be established in the mold from source 24. Of course, in this case, there will be no premature release of gas from the mix before it enters the mold and release of the gas will only take place when the mix is subjected to vacuum.

If desired, to facilitate the removal of the gas from the mix or the water contained therein, the mold may be heated to raise the temperature of the ingredients of the mix.

In the description above, it was stated that the gas could be applied to the water in the pressure tank 1. It is readily apparent that the gas can be added at several different stages in the process and the pressure can be varied depending upon the amount of gas desired in the mix. In molding concrete products, if the graduation of the solid components of the mix is such as to provide a minimum amount of void space in the shape of interstices then relatively small amounts of gas will be required to obtain the desired results, in which case the gas could be added to the water prior to mixing or during the mixing process or in tank 1. That is, the mix or the water contained therein would not be supersaturated with the gas. If, on the other hand, the gradation of the mix was such as to allow very large amounts of void space it may be found essential to incorporate as much gas as possible in the mix. In such a case it may be advisable to add the gas under superatmospheric pressure preferably at the pressurizing stage in tank 1 and use much more pressure than would normally be required to fill the mold, thus, supersaturating the mix.

It might even be desirable to subject the aggregate, particularly if it is a porous aggregate, to gas pressure prior to wetting, thereby forcing into the mix the maximum amount of gas possible. Practice in the art teaches the most practical time for the addition of gas and I have found in general that subjecting the mix to gas pressure at the pressurizing stage in tank 1 is the most satisfactory method.

As hereinbefore described, while this process is primarily directed towards the molding of concrete it can readily be seen that it would work equally well in molding a slurry of wool fibers or paper fibers or almost any other type of material which owes its plasticity to a suspension in liquid.

In the interests of clarity it should be understood that this process in no way resembles well known processes for making gaseous concrete wherein chemicals are added to the mix, these chemicals reacting with the cement to form gases, these gases in turn expanding the concrete through the multiplicity of small bubbles, these bubbles staying in the concrete permanently and thereby making it materially lighter per cubic foot. In these processes the object is to maintain the gas in the concrete until after it has set, whereas in my process the object is to remove gas from the concrete and thereby entrain and remove water from the concrete before any appreciable chemical set has taken place in the concrete.

While I prefer to use carbon dioxide, several factors will influence the choice of the gas to be used. The gas is one which is preferably highly soluble in water. The gas must be devoid of any undesirable physical or chemical characteristics which might damage the end product or the molding equipment, because large quantities of the gas normally are used. Also cost and availability of the gas are factors. The gas should preferably be non-toxic.

It is very obvious that air would be the most logical of all gases to use and in many cases this is true. However, the absorption of air by water at normal temperatures and pressure is not as high as carbon dioxide, for instance, and, hence, the water removed by entrainment is not as rapid where air is used as when carbon dioxide is employed. If air is employed it may be found desirable to employ air in the water or the mix in the supersaturated condition, which can be obtained by subjecting the mixing water or the mix to air under superatmospheric pressure, and/or by cooling the mixing water below normal temperatures to make it more absorptive. As was previously explained it is obvious that the gas could be added in the mixer during the mixing operation; in the water before mixing; or in the tank 1. However, the addition of the gas in the tank 1 is preferred in most cases due to the agitation of the mix in said tank which materially affects and accelerates the rate of absorption of the gas, as opposed to subjecting the mix to gas in a quiescent state. Of course, if the entire system is pressurized to supercharge the mix, the gas may be charged to either or both the mixer 1' and tank 1.

If desired, the water removed from the mix may be recovered in a recovery tank 25 connected to the outlet of the vacuum means 23. This water may carry portions of the gas employed and also will carry cement fines which may pass through the foraminated walls 15 and 16. The recovered water may then be used as mixing water for succeeding batches of the mix.

I claim as my invention:

1. A method of forming an article from a plastic mix comprising water as a liquid vehicle which comprises incorporating a fluid consisting essentially of a gas more readily absorbable by said vehicle than air into the mix to cause said mix to carry a quantity of said gas, transferring said gas-charged mix to a mold to substantially fill the same, subjecting the mix in the mold to densifying pressure to compact the mix and cause the solid particles thereof to move into substantially contiguous relationship with one another, subjecting the mix in the mold to subambient pressure while said mix is maintained under densifying pressure to release the gas from the mix in the mold to carry liquid vehicle from the interstices of the mix between said contiguous solid particles by entrainment in said gas, and removing said gas and entrained vehicle from the situs of the mix in the mold.

2. A method of forming an article from a plastic mix comprising water as a liquid vehicle which comprises, incorporating a gas more readily absorbable in water than air and comprising essentially carbon dioxide into said mix to cause said mix to carry a quantity of said gas, transferring said gas-charged mix to a closed mold to substantially fill the same, subjecting the mix in the mold to densifying pressure to compact the mix and cause the solid particles thereof to move into substantially contiguous relationship with one another, subjecting the mix in the mold to subambient pressure while maintaining said solid particles in contiguous relationship to release the gas from the mix in the mold to carry liquid vehicle from the interstices of the mix between said contiguous solid particles by entrainment in said gas, and removing said gas and entrained vehicle from the situs of the mix in the mold.

3. A method of forming an article from a plastic mix comprising water as a liquid vehicle which comprises, mixing a portion of the mix including the liquid vehicle with a fluid consisting essentially of a gas more readily absorbable by said vehicle than air to cause said vehicle to carry a quantity of said gas, transferring said mix including said gas-charged vehicle to a mold to substantially fill the same, subjecting the mix in the mold to densifying pressure to compact the mix and cause the solid particles thereof to move into substantially contiguous relationship with one another, simultaneously subjecting the mix in the mold to subambient pressure to release the gas from the mix in the mold to carry the liquid vehicle from the interstices of the mix between said contiguous solid particles by entrainment in said gas, and removing said gas and entrained vehicle from the situs of the mix in the mold.

4. A method of forming an article from a plastic mix comprising water as a liquid vehicle which comprises, mixing a portion of the mix including the liquid vehicle with a fluid the major portion of which comprises a gas more readily absorbable by said vehicle than air to cause said vehicle to carry a quantity of said gas, transferring said mix including said gas-charged vehicle to a mold to substantially fill the same, subjecting the mix in the mold to densifying pressure applied to the interior of the mix to densify the mix and cause the solid particles thereof to move into substantially contiguous relationship with one another and move the mix into all exterior portions of the mold, subjecting the exterior portions of the mix in the mold to subambient pressure while the mix is maintained under densifying pressure to release the gas from the mix in the mold to carry liquid vehicle from the interstices of the mix between said contiguous solid particles by entrainment in said gas, and removing said gas and entrained vehicle from the situs of the densified mix in the mold.

5. A method of molding an article from a flowable mix comprising a solid component and water as a liquid vehicle which comprises, super-charging the liquid vehicle of the mix under superambient pressure with a gas which is readily soluble in said liquid vehicle, maintaining said mix under superambient pressure to prevent premature substantial release of said gas from said mix, passing said gas-charged mix to a closed mold to substantially fill the same, subjecting the mix in the mold to physical pressure to densify the same, and after said mix is in said mold and after said mix is subjected to said densifying pressure subjecting said mix to an ambient pressure lower than the pressure at which the supercharging was carried out to release gas from the mix and carry liquid vehicle from the mix with said released gas by entrainment, and removing said released gas and entrained liquid vehicle from the situs of the mix in the mold.

6. A method of molding an article from a flowable mix comprising a solid component and water as a liquid vehicle which comprises, supercharging the water of said mix with carbon dioxide, maintaining said super-charged mix under predetermined superambient pressure to prevent premature substantial release of carbon dioxide from said mix, passing said super-charged mix to a closed mold to substantially fill the same, subjecting the mix in the mold to physical pressure to densify the same, and after said mix is in said mold and after said mix has been subjected to said densifying pressure subjecting said mix to an ambient pressure below said predetermined superambient pressure to release carbon dioxide from the mix and carry water from the mix with said released carbon dioxide by entrainment, and removing said released carbon dioxide and entrained water from the situs of the mix in the mold.

References Cited in the file of this patent

UNITED STATES PATENTS

| | | |
|---|---|---|
| 1,492,642 | Lake | May 6, 1924 |
| 1,856,929 | Peck et al. | May 3, 1932 |
| 1,944,007 | Hobart | Jan. 16, 1934 |
| 1,995,540 | Harrison | Mar. 26, 1935 |
| 2,474,721 | Billner | June 28, 1949 |
| 2,528,643 | Dubbs | Nov. 7, 1950 |
| 2,628,402 | Billner | Feb. 17, 1953 |
| 2,650,409 | Dubbs | Sept. 1, 1953 |
| 2,671,940 | Billner | Mar. 16, 1954 |